UNITED STATES PATENT OFFICE.

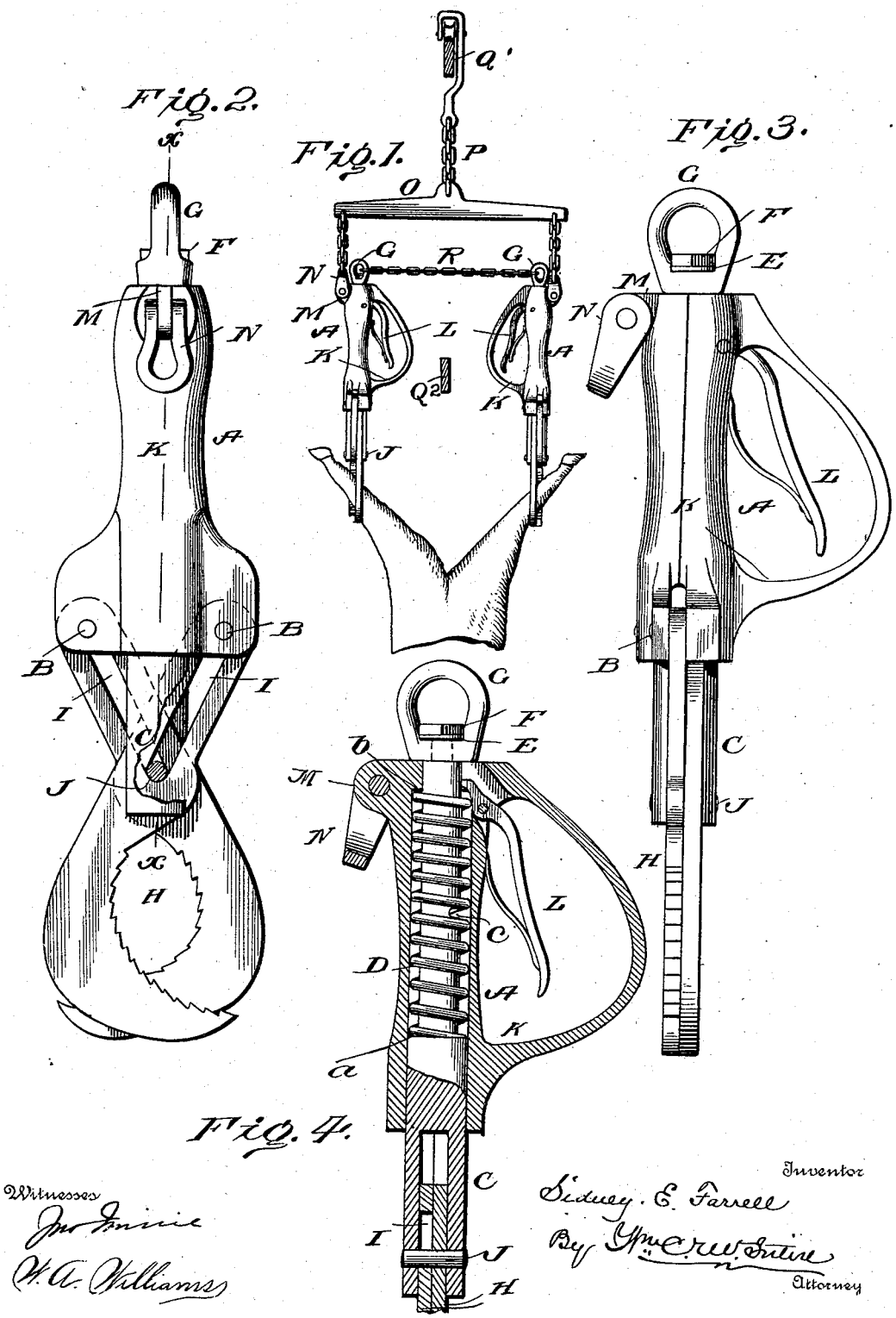

SYDNEY E. FARRELL, OF OTTUMWA, IOWA.

ANIMAL-SHACKLE.

SPECIFICATION forming part of Letters Patent No. 661,637, dated November 13, 1900.

Application filed August 15, 1899. Renewed August 27, 1900. Serial No. 28,244. (No model.)

*To all whom it may concern:*

Be it known that I, SYDNEY E. FARRELL, a citizen of the United States, residing at Ottumwa, in the county of Wapello and State of Iowa, have invented certain new and useful Improvements in Animal-Shackles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in shackles for use in butchering animals and in devices connected with said shackles to automatically release the animal when desired.

It has for its object to provide a shackle which after being set may be instantly and automatically clasped around the leg of an animal and automatically released therefrom; and with this end in view my invention consists in the construction and arrangement hereinafter more fully set forth.

In order that those skilled in the art to which my invention appertains may know how to make and use my improved shackle, I will proceed to describe its construction and operation, referring by letters to the accompanying drawings, in which—

Figure 1 represents in section the upper and lower tracks usually employed in butchering establishments, with a pair of my improved shackles sustaining an animal and so arranged relatively to the tracks that the weight of the animal shall operate to release the shackles. Fig. 2 is a side elevation, on an enlarged scale, of one of my improved shackles. Fig. 3 is a side elevation at right angles to that shown at Fig. 2, and Fig. 4 is a longitudinal section on the line $xx$ of Fig. 2.

Similar letters of reference denote like parts in the several figures of the drawings.

A represents the case or handle of the shackle, which is made in two similar parts adapted to be secured together by bolts or rivets B. Each half of the case is cored out longitudinally to receive a reciprocating bar C, the lower end of which is enlarged and bifurcated, as shown clearly at Fig. 4, the other portion being reduced to receive an operating coil-spring D and to provide an annular shoulder $a$, against which said spring bears. The longitudinal recess in each half of the case is reduced near the upper end to constitute a shoulder $b$, against which the upper end of the spring D bears. The upper end of the bar C is threaded to receive a washer E and nut F; but the threads are not shown, as the nut and washer are shown in elevation, and it will be obvious to one skilled in reading the drawings how a nut and washer are secured in place by a screw-thread, between which and the end of the handle is secured a swivel G, and whereby the rod is secured within the case.

H H are twin jaws formed with longitudinal slots I and secured between the two parts A of the handle by the pivot bolts or rivets B. These jaws are crossed within the bifurcated end of the bar C, as shown in Fig. 2, and secured in position by a pivot-bolt J, passing through the said bar and the longitudinal slots I of the jaws, as clearly shown in Figs. 2, 3, and 4. One portion of the case is formed with a handhold K and is provided with a spring pawl or latch L, one end of which is adapted to enter into a notch or recess $c$ in the bar C to lock the same and hold the jaws H H in open position in an obvious manner.

M is a lug to which is pivoted a link or curved arm N, adapted to be hooked or connected to a spreader or brace O, adapted to sustain two shackles in the position shown at Fig. 1 and to sustain the weight of the animal when elevated. This spreader O is connected centrally by a chain P or otherwise to a traveling trolley or track-hook Q.

The swivels G are connected by a short chain R, as clearly shown at Fig. 1.

Q' is the upper track or rail, and $Q^2$ is the lower track or rail.

The shackles, spreader, and trolley or hook bear such proportional relations to one another that when the trolley or hook is upon the upper track Q' the connecting-chain R will be in a plane above the lower track or rail $Q^2$, as shown. The jaws H H being opened and locked in such position by the pawl or dog L, the leg of the animal is automatically grasped by releasing the pawl or dog in an obvious manner, and when both legs have been thus grasped the animal is raised or elevated by lifting the spreader O and placing the trolley or hook Q on the upper track or rail. When the trolley or hook and the shackles have reached the end of the upper rail and fall vertically therefrom, the connecting-chain R comes in contact with the upper surface of the lower rail or track and the weight of the animal held by the jaws of the shackle pulls the handle or case A downwardly on the bar C until the latch or dog L catches in the notch thereof and locks it in position, with the spring D compressed between the shoulders $a\ b$ and in condition to retract the handle or case when the pawl L is withdrawn from the notch in the reciprocating bar. The jaws being connected to the case A and bar C by the pivot bolts or rivets B B and J, respectively, passing through the slots, as described, the downward movement of the case A, with the pivot-bolts B traveling through the slots in the upper portion of the jaws, spreads the same in an obvious manner, as the pivot J, passing through the lower end of the bar C and at the lower extremity of each slot of the jaws H, prevents the latter from moving upwardly.

What I claim as new, and desire to secure by Letters Patent, is—

1. A shackle-hook composed of a case or handle A, a reciprocating bar C bifurcated at the lower end and secured within the case or handle, an actuating-spring between the bar and case, and jaws H H slotted longitudinally and pivoted through said slots to the case, and within the bifurcated end of the reciprocating bar, substantially as and for the purpose set forth.

2. The double shackle composed of the cases A, reciprocating bars C, provided with lateral projections M N; actuating-springs D, jaws H, H, the swivels or rings G, connecting-chain R, and spring-latches L, substantially as and for the purposes set forth.

3. In combination with two shackles composed of cases A, reciprocating bars C, provided with lateral projections M N, actuating-springs D, jaws H, H, and swivels or rings G; the chain R, connecting the two rings G, the spreader O, provided with a suspension-hook, and connected with the lateral projections M N, substantially as and for the purposes set forth.

In testimony whereof I affix my signature in presence of two witnesses.

SYDNEY E. FARRELL.

Witnesses:
F. G. ORELUP,
W. D. STRONG.